3,389,048
METHODS OF REPELLING ANIMALS WITH TRICYCLOHEXYLTIN COMPOUNDS

Eugene E. Kenaga, Midland, Mich., assignor to The Dow Chemical Company, Midland, Mich., a corporation of Delaware
No Drawing. Filed Aug. 22, 1966, Ser. No. 573,885
5 Claims. (Cl. 167—46)

ABSTRACT OF THE DISCLOSURE

Methods of repelling chewing animals from substances normally chewed by said animals with tricyclohexyltin compounds.

---

This invention is concerned with the application of a tricyclohexyltin compound to a locus susceptible of attack by a chewing animal, whereby the animal is repelled and chewing, such as feeding, is prevented. "Animal" in the present invention refers expressly to mammals.

It is often desired to discourage chewing animals from attacking, perhaps eating substances to which they are normally attracted. At times repelling may be preferred to killing or attempting to kill the animals. Representative situations to which the present invention is well adapted include the protection of corrugated board boxes and their contents from attack by mice and rats, the protection of wooden structures including cage and stanchion members from gnawing by rabbits, goats, horses and the like; the protection of vegetation, and, in particular, dormant trees and shrubs, from attack by rabbits and deer; the protection of standing trees from beaver, and the like.

According to the present invention, it has been discovered that, surface deposits or substantive content of very small amounts of tricyclohexyltin compounds are extremely repellent to feeding mammals. While at higher concentrations, the substances are toxic to animals, no animal upon which the substance has ever been tested will, even at point of incipient starvation and severe malnutrition, eat any substance which bears a substantial and continuous coating, deposit, or content of a tin compound according to the present invention. Ingestion poisoning occurs only with force feeding.

The invention is practiced with straight-forward procedures. When it is desired to protect a box, such as a paper or corrugated board box, or its contents, the tin compound can be dispersed in a carrier liquid and applied as a spray or dip; alternatively, the tin compound can be incorporated in desired concentration in the paper pulp slurry as the paper is being manufactured. In another mode of operation, the tin compound can be dispersed in glue or similar adhesive substance, intended to be used in fabricating a bag, box, or other container, since many commonly employed glues and related adhesives, notably the dextrin-based or gelatin-based adhesives, are particularly attractive to predatory rodents. Also, the substance can be applied as a spray, swab, dust, or paint to the trunk of a tree, shrub, or young seedling plant susceptible of attack by foraging animals. The vegetable growth is thereby rendered exceedingly distasteful to the animal so long as the deposit remains. Persistence of the deposit can be enhanced by its incorporation into a carrier such as a paint, sizing, or other adhesive vehicle. When it is desired to protect from attack, such as rodent attack, seeds, such as grain and bean seeds that are to be used as planting stock, the compound can be applied directly to the said seed as well as to containers to hold it. The compounds are repellent in concentrations that are very low as fractions of the weight of seeds.

The mode of operation of the present substance as repellent is not known. The compounds are known to be of very low solubility in water and in aqueous fluids generally. They are of very low vapor pressure and so nearly odorless that traces of solvents used in their preparation may be more noticeable. To the human sense of taste, small samples of representative compounds seem completely tasteless and without organoleptic effect of any describable kind.

In use, the compounds do not seem to evoke an initial response of distaste. When a repellent compound according to the present invention is incorporated into a routine laboratory diet of a small laboratory animal, such as mouse, rat, guinea pig, or hamster, it seems to feed normally at first on the repellent-treated diet. However, with no evidence of sickness, emesis, or distaste, the animal very soon ceases to eat the food containing the repellent compound. Given no other food, the animal will reject the food to the point of severe malnutrition, rather than eat it. So pronounced is this phenomenon that it is impossible to conduct meaningful chronic oral toxicity studies on the compounds by ad libitum feeding techniques.

The compound to be employed according to the present invention is a tin compound of the formula

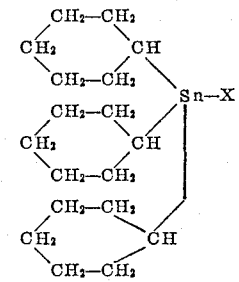

in which X represents hydroxyl, bromo, chloro, fluoro, iodo, formyloxy, alkenyl,

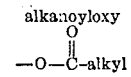

(tricyclohexylstannyloxy)alkoxy,

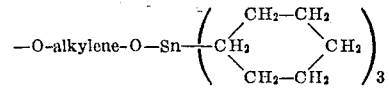

tricyclohexylstannyl,

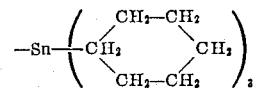

tricyclohexylstannyloxy,

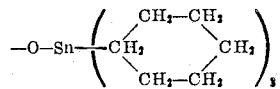

tricyclohexylstannylthio,

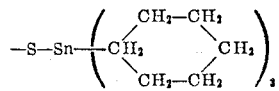

bis(tricyclohexylstannyloxy)-boryloxy,

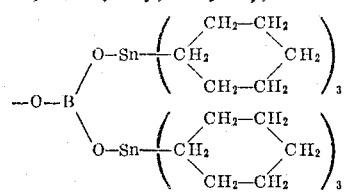

tricyclohexyltinsulfinyl,

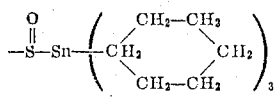

tricyclohexyltinsulfonyl,

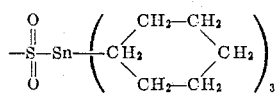

alkylsulfonylthio,

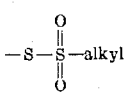

phenylsulfonylthio,

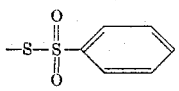

halophenylsulfonylthio,

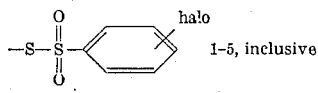

alkanoylthio,

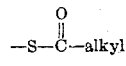

benzoylthio,

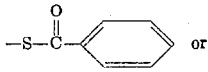 or halobenzoylthio,

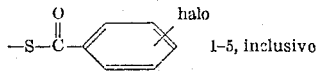

These tin compounds are crystalline solid materials which are of low solubility in water. The most useful alkenyltricyclohexyltins are those of which the alkenyl group is from two to about twenty, both inclusive, carbon atoms, such as vinyl, allyl, 2-butenyl, 2-pentenyl, 5-hexenyl, 3-heptenyl, 1-octenyl, 3,3-diethylpent-1-enyl, 9-decenyl, 2-pentadecenyl which will usually be a mixture of isomers, oleoyl, which can be derived inexpensively from animal fats, and 2-eicosenyl.

The most useful alkanoyloxythicyclohexyltin compounds are those in which the alkanoyloxy groups can be regarded as a residue of an aliphatic acid of from two to about twenty, both inclusive, carbon atoms, such as the alkanoyloxy residues of acetic, isovaleric, caproic, caprylic, capric, lauric, myristic, palmitic, stearic, and arachidic acids.

Among the (tricyclohexylstannyloxy)alkoxytricyclohexyl tin compounds, the most highly regarded are those in which the alkylene moiety is of from 1 to about 4 carbon atoms, although when oil solubility is desired, especially when water emulsification of the resulting oil solution is desired, alkylenes of from 4 up to about 10 or even 20, both inclusive, carbon atoms are more satisfactory. Thus, representative such compounds include (tricyclohexylstannyloxy)methoxy tricyclohexyl tin; (tricyclohexylstannyloxy) trimethyleneoxy tricyclohexyl tin; (tricyclohexylstannyloxy) propoxytricyclohexyl tin; and (tricyclohexylstannyloxy) tetramethyleneoxy tricyclohexyl tin. When greater compatibility with oil is desired, one will prefer, for example, (tricyclohexylstannyloxy)pentoxytricyclohexyl tin; or (tricyclohexylstannyloxy)tridecyloxy tricyclohexyl tin. Also, (tricyclohexyl stannyloxy)-hexadecyloxy tricyclohexyltin and (tricyclohexylstannyloxy)nonadecyloxy tricyclohexyl tin.

The alkanoylthiotricyclohexyltin compounds are represented by acetylthiotricyclohexyltin, and propionylthio tricyclohexyltin. However, alkanoylthio groups of from 2 up to about 20 carbon atoms are successfully employed. Thus among the serviceable compounds are butyroylthiotricyclohexyltin, valeroylthiotricyclohexyltin, hexanoylthiotricyclohexyltin, heptanoylthiotricyclohexyltin, octanoylthiotricyclohexyltin, nonanoylthiotricyclohexyltin, decanoylthiotricyclohexyltin, undecanoylthiotricyclohexyltin, lauroylthiotricyclohexyltin, tridecanoylthiotricyclohexyltin, myristoylthiotricyclohexyltin, pentadecanoylthiotricyclohexyltin, palmitoylthiotricyclohexyltin, heptadecanoylthiotricyclohexyltin, stearoylthiotricyclohexyltin, nonadecanoylthiotricyclohexyltin, eicosanoylthiotricyclohexyltin, and the position isomers of the foregoing with respect to the aliphatic carbon chains, such as 2,2,4,4-tetramethylbutyroylthiotricyclohexyltin, and the like.

Also, when employing an alkylsulfonylthiotricyclohexyltin, the compounds characterized by lower-alkyl groups may be preferred, or those of higher molecular weight may have advantages. These advantages diminish in the compounds having alkyl groups of more than about 20 carbon atoms.

Thus, the alkylsulfonylthiotricyclohexyltin compounds most commonly chosen will include methylsulfonylthiotricyclohexyltin, ethylsulfonylthiotricyclohexyltin, propylsulfonylthiotricyclohexyltin, butylsulfonylthiotricyclohexyltin, 2,2-dimethylpropylsulfonylthiotricyclohexyltin, hexylsulfonylthiotricyclohexyltin, 4,4-dimethylpentylsulfonylthiotricyclohexyltin, dodecylsulfonylthiotricyclohexyltin, nonadecylsulfonylthiotricyclohexyltin and its next higher homologue, and the branched and straight chain position isomers.

Among the halophenylsulfonylthiotricyclohexyltin compounds are p-chlorophenylsulfonylthiotricyclohexyltin, p-bromophenylsulfonylthiotricyclohexyltin, p-iodophenylsulfonylthiotricyclohexyltin, p-fluorophenylsulfonylthiotricyclohexyltin, and, in each case, the ar-orthohalo position isomer. Also, useful is metabromophenylsulfonylthiotricyclohexyltin, and its fluoro-, chloro-, and iodohalogen analogues. Not only the monohalo compounds but the dihalo compounds including 2,4-difluorophenylsulfonylthiotricyclohexyltin, 2,4-dichlorophenylsulfonylthiotricyclohexyltin, and their bromine and iodine position isomers. Also, the compounds of mixed halogens such as 2-chloro-4-bromo-phenylsulfonylthiotricyclohexyltin, 2-fluoro-6-chloro-phenylsulfonylthiotricyclohexyltin, and 2-chloro-5-iodophenylsulfonylthiotricyclohexyltin. The trihalophenyl starting compounds are sometimes the least expensive and there can be used as the present repellents each or any of 2,4,5-trifluorophenylsulfonylthiotricyclohexyltin, 2,4,6-trichlorophenylsulfonylthiotricyclohexyltin, and such mixed halogen analogues as 2-chloro-4,5-dibromophenylsulfonylthiotricyclohexyltin, 2,4-dibromo-5-iodophenylsulfonylthiotricyclohexyltin, and 2,3,4-trifluorophenylsulfonylthiotricyclohexyltin. The tetrahalo and pentahalophenylsulfonylthiotricyclohexyltin compounds whereof halogen is of the identity and variety hereinbeforenamed tend to be less soluble and more costly but, in contrast, of usefully greater chemical stability; they are comprehended herein, also.

Much the same range of substituents is comprehended under the halobenzoylthiotricyclohexyl tin compounds, such as pentachlorobenzoylthiotricyclohexyltin, pentafluorobenzoylthiotricyclohexyltin, 3,4,5-trichloro-2,6-difluorobenzoylthiotricyclohexyltin, 2,3,5,6-tetrachlorobenzoylthiotricyclohexyltin, and such lower analogues as p-iodobenzoylthiotricyclohexyltin, 2,4,5-trichlorobenzoyl-thiotricyclohexyltin, 2,6-difluoro-4-iodobenzoylthiotricyclohexyltin, and the analogues and position isomers of the indicated genus that are thereby comprehended.

As a preferred compound may be chosen for its preferred side effects and properties, all the indicated compounds being repellent, when certain combinations of side effects are wanted, one, two, or several of the compounds will be combined. Thus, the present invention in repellents comprehends all the subgeneric combinations and mixtures of the present compounds, all of which combinations and each of the components of which are repellent but of various of which the auxiliary properties vary. While the compounds foregoing are essentially all equivalents as regards the present invention, a preferred compound of the present invention is tricyclohexyltin hydroxide. This compound exhibits phytotoxicity sufficiently low that it can be applied to plant materials to repel foraging mammals without injury to the plants; it is of good stability, essentially innocuous when employed in printing inks, papers, adhesives and the like; is essentially odorless, and, being white in color, presents no problem of adverse color in papers and so forth. When incorporated into a paper or the like it has little or no tendency to migrate from the paper. The following examples set forth the best methods now known to practice the present invention.

Example 1

A corrugated board is manufactured in procedures that are completely routine except that the adhesive employed in bonding the corrugated inner layer to the parallel flat outer layers is modified by the admixture thereinto of tricyclohexyltin hydroxide in an amount equivalent to 1.0 percent by weight of dried adhesive and the paper assembled with the said modified adhesive; as the paper is assembled, a lacquer spray is applied to the outer surfaces of the said paper, the said lacquer spray containing, and acting as vehicle-binder for, suspended tricyclohexyltin hydroxide in an amount corresponding to 0.01 part by weight of resulting treated corrugated paper.

Example 2

The paper of Example 1 is used to manufacture a group of corrugated board boxes. The boxes are used to contain warehouse lots of retail packages of representative food items including rolled oats, cornmeal, cake mixes, and peanuts.

Similar boxes made of standard, unmodified corrugated board, and with similar contents, are also provided. Both lots of boxes are held for one week under warehouse conditions deliberately supplied with infestation at a moderate population density of feral Norway rats.

Minor chewing damage is done to the exteriors of the boxes prepared with the compound of the present invention. The standard corrugated board boxes are all entered, their contents seriously damaged and rendered essentially a total loss.

Example 3

A group of three healthy, normal laboratory white rats accustomed to a routine commercial laboratory diet are supplied with the same diet modified by the admixture therewith, as a dust, of tricyclohexyltin hydroxide in the amount of 0.1 part by weight of diet. After initially sampling the diet, the rats avoid it. They are observed over a period of three days and found to continue their fast rather than eat. They are maintained in this condition until one of the rats dies of malnutrition and starvation; the two remaining are in advanced states of malnutrition and none has eaten significantly of the modified rat diet.

Example 4

A nursery planting of young apple trees of varietal scions grafted onto dwarfing root stock, in a nursery on Long Island, N.Y., in which there is long experience of severe winter damage by mice and rabbits, has routinely been protected by providing the young trees with individual screen wire collars from earth line to a height of about one foot at great expense.

From a selected area of the nursery planting, these collars are removed and the trees sprayed, in early December before the arrival of heavy winter snows, with an alkyd-base paint into which is mixed 1 percent by weight of total liquid paint of tricyclohexyltin hydroxide. No further treatment is employed. The following spring the area is examined for rodent injury and found to be essentially undamaged. Routine damage has occurred in the screen collar protected area.

Example 5

A commercial formulation of paint with a film-forming styrene-butadiene latex polymer vehicle, rendered white by the presence of titanium dioxide and routinely prepared with thickeners, preservatives and the like, is modified by the incorporation thereinto of tricyclohexyltin hydroxide in the amount of 5 parts per 100 parts all by weight of the resulting modified paint. The paint is adapted to be employed as a surface coating to confer repellency against animal chewing to surfaces so treated.

Example 6

A wall board intended to be used with minimal rodent-gnawing damage in a location where rodent damage to wooden structures and the like is common, is made by the felting together and resin bonding of bagasse fibers, by the addition of 1 part tricyclohexyltin hydroxide by weight of total resin binder to the resinous material used to effect cohesion of the board. The appearance and properties other than gnawing repellency of the board are essentially unmodified.

Example 7

A nursery in Pennsylvania producing seedling evergreen stock for ornamental and forestry planting purposes has annually suffered heavy deer feeding damage in May and June as new shoots of growth appear on the young seedling trees in nursery rows.

In an area where deer damage is consistently severe, the young plants are sprayed, at 2-week intervals, with an aqueous suspension of tricyclohexyltin hydroxide together with a gummy binder to effect its better adherence to the trees. Frequency of spraying is adjusted to maintain a surface coating of the tin compound as the growing shoots elongate. Where the nursery stock is thus sprayed, deer damage is negligible; in adjacent unsprayed areas it is severe.

Essentially identical results are obtained when the employed compound is tricyclohexyltin chloride.

Example 8

Chewing has seriously weakened and deformed the lumber comprising a manger and feed box in a horse stall in a small barn. The heavily chewed pieces are removed and replaced with new lumber painted with two coats of the latex paint modified according to present Example 5 hereof. Upon completion of the repairs, the stall is again put into service. Six months later, tooth marks are visible in a few places, and minor damage has been inflicted; the serious and persistent earlier pattern of damage has been stopped.

Example 9

Expanded polystyrene boards, assembled as the floor and lower wall of a temporary greenhouse, are severely attacked at the beginning of cold weather by rodents, notably Peromyscus and Norway rat, seeking shelter. The attack takes the form of the chewing away of the relatively yielding substance of the expanded polymer. Several nests are found.

The floor boards and lowest two foot-wide courses of board of the wall are removed, and replaced with board similar except that, in the molten polymer with blowing agent, prior to its expansion and solidification, as the board is manufactured, there is included one percent by weight of polymer of tricyclohexyltin hydroxide. The board so modified is then installed in the said greenhouse. Examination the following spring discloses that essentially no rodent attack has occurred, although burrows are found beneath the floor boards and along the base of the walls.

Example 10

A thermal building insulation is prepared from cotton batting by treating it in known manner with fire retardants and lightly resin bonding the fibers together. The manufacture is modified to include, in the step of applying the fire retardant substances, a rodent repellent amount, presently 0.1 percent by weight of cotton fiber, of tricyclohexyltin hydroxide.

The material is tested by exposure to confined feral Norway rats, and conventional similar insulation, lacking the tin compound, is tested with it and at the same time and place. Nesting activities of the rats do severe damage to the conventional insulation; incipient damage is noted at a few places on the insulation containing the tin compound.

The process is repeated, and with essentially identical results, when employing tricyclohexyltin acetate. Also, similar results are obtained when employing bis(tricyclohexyltin) oxide.

Example 11

A paper is made for use in fabricating paper bags, in routine Fourdrinier machine practice, except that the paper pulp slurry, before issuing from the machine, is modified by the admixture thereinto of tricyclohexyltin acetate in the amount of 0.1 part by weight of dry solids of the slurry. The resulting slurry is spread, dried, and fabricated in routine practice into a paper.

The paper bearing the tin compound is then used to fabricate a paper bag which, in turn, is used to contain edible substances attractive to mice.

A similar bag is made from an unmodified paper.

Both bags, with attractive edible contents (peanuts) are placed where a mouse has access to them. The contents of the bag made from unmodified paper are destroyed by the mouse. The contents of the bag made from paper bearing the tin compound are essentially untouched.

Similar results are obtained when making heavier paper for use in fabricating boxes; or when tricyclohexyltin hydroxide is used instead of the acetate. The other compounds of this invention give similar results. For incorporation into wax paper, a long chain aliphatic group can be attached to the tricyclohexyltin group.

The method of the present invention is adapted to be employed, and the compositions and articles of the present invention to be applied, to any situation where chewing damage by animals is a problem. Thus, the present invention comprehends a cloth fabric such as a cotton fabric imprinted, sized, or impregnated with a tin compound of the present invention; paper, fiberboard, wallboard, hardboard, and wood lumber coated or impregnated with a tin compound with or without vehicle according to the present invention; the use of the tin compound to prevent damage by porcupines, flying squirrels, pack rats, chipmunks, and other such creatures, to summer cottages which are left unoccupied through considerable parts of the year; the preparation and use of containers modified according to the present invention whereby the unmodified contents of the said containers are protected from chewing attacks; and the like.

I claim:

1. A method of repelling a chewing animal from a substance normally chewed by said animal which comprises contacting said animal with a repelling amount of a compound of the formula

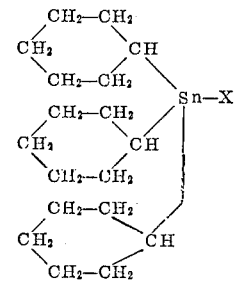

wherein X represents a member of the group consisting of hydroxyl, bromo, chloro, fluoro, iodo, alkenyl, alkanoyloxy, tricyclohexylstannyloxy, tricyclohexylstannylthio, tricyclohexylstannyl, (tricyclohexylstannyloxy) alkoxy, bis(tricyclohexylstannyloxy)-boryloxy, tricyclohexyltin sulfinyl, tricyclohexyltin sulfonyl, alkylsulfonylthio, phenylsulfonylthio, halophenylsulfonylthio, alkanoylthio, benzoylthio, halobenzoylthio, and formyloxy, which compound is impregnated into said substance.

2. Method claimed in claim 1 wherein the tin compound is tricyclohexyltin hydroxide.

3. Method claimed in claim 1 wherein the tin compound is tricyclohexyltin chloride.

4. Method claimed in claim 1 wherein the tin compound is tricyclohexyltin acetate.

5. Method claimed in claim 1 wherein the tin compound is bis(tricyclohexyltin) oxide.

References Cited

UNITED STATES PATENTS 3,264,177   8/1966   Kenaga _____ 167—30

ALBERT T. MEYERS, *Primary Examiner.*

S. J. FRIEDMAN, *Assistant Examiner.*